US010484360B2

(12) United States Patent
Winkelvos et al.

(10) Patent No.: US 10,484,360 B2
(45) Date of Patent: Nov. 19, 2019

(54) METHOD FOR PROVIDING AN AUTHENTICATED CONNECTION BETWEEN AT LEAST TWO COMMUNICATION PARTNERS

(71) Applicant: VOLKSWAGEN AG, Wolfsburg (DE)

(72) Inventors: Timo Winkelvos, Sickte (DE); Alexander Tschache, Wolfsburg (DE); Martin Wuschke, Meine (DE)

(73) Assignee: Volkswagen AG (DE)

( * ) Notice: Subject to any disclaimer, the term of this patent is extended or adjusted under 35 U.S.C. 154(b) by 274 days.

(21) Appl. No.: 15/659,672

(22) Filed: Jul. 26, 2017

(65) Prior Publication Data
US 2018/0034806 A1 Feb. 1, 2018

(30) Foreign Application Priority Data

Jul. 26, 2016 (DE) .................. 10 2016 213 686

(51) Int. Cl.
*H04L 29/06* (2006.01)
*H04W 4/40* (2018.01)
(Continued)

(52) U.S. Cl.
CPC ........ *H04L 63/0823* (2013.01); *H04L 9/0825* (2013.01); *H04L 9/3263* (2013.01); *H04L 63/08* (2013.01); *H04W 12/06* (2013.01)

(58) Field of Classification Search
None
See application file for complete search history.

(56) References Cited

U.S. PATENT DOCUMENTS

| 2003/0147534 A1* | 8/2003 | Ablay | H04L 9/3271 380/270 |
| 2003/0159029 A1* | 8/2003 | Brown | G07B 17/00193 713/151 |

(Continued)

FOREIGN PATENT DOCUMENTS

| DE | 102005028663 A1 | 12/2006 |
| DE | 102012211682 A1 | 1/2013 |

(Continued)

OTHER PUBLICATIONS

Wikipedia; Bluetooth; Jul. 22, 2016; downloaded from https://en.wikipedia.org/w/index.php?title=Bluetooth&oldid=731033839.

(Continued)

*Primary Examiner* — Fatoumata Traore
(74) *Attorney, Agent, or Firm* — Barnes & Thornburg LLP

(57) ABSTRACT

A method for providing an authenticated connection between at least two communication partners and to a communication system. The method includes setting up an anonymous signal-conducting connection between the at least two communication partners; checking the authenticity of a signed certificate used by a first communication partner of the at least two communication partners by a second communication partner of the at least two communication partners; reproducing an authentication code by the second communication partner after the check of the authenticity of the signed certificate used by the first communication partner has been carried out; and confirming the authentication code reproduced by the second communication partner by a user by the first communication partner. The method provides a possibility which increases the security of a certificate-based authentication of a communication connection between at least two communication partners.

18 Claims, 2 Drawing Sheets

(51) Int. Cl.
*H04L 9/08* (2006.01)
*H04L 9/32* (2006.01)
*H04W 12/06* (2009.01)

(56) References Cited

U.S. PATENT DOCUMENTS

| | | |
|---|---|---|
| 2006/0015722 A1 | 1/2006 | Rowan et al. |
| 2009/0222659 A1* | 9/2009 | Miyabayashi ...... H04L 63/0823 713/156 |
| 2009/0325491 A1 | 12/2009 | Bell et al. |
| 2010/0037057 A1* | 2/2010 | Shim ................... H04L 63/0823 713/171 |
| 2015/0339334 A1 | 11/2015 | Hanke |

FOREIGN PATENT DOCUMENTS

| | | |
|---|---|---|
| DE | 102013225742 A1 | 6/2014 |
| KR | 20120014887 A | 2/2012 |
| KR | 20160060554 A | 5/2016 |

OTHER PUBLICATIONS

Office Action for Korean Patent Application No. 10-2017-0093521; dated Mar. 14, 2019.
Search Report for European Patent Application No. 17180654.0; dated Nov. 29, 2017.

* cited by examiner

METHOD FOR PROVIDING AN AUTHENTICATED CONNECTION BETWEEN AT LEAST TWO COMMUNICATION PARTNERS

PRIORITY CLAIM

This patent application claims priority to German Patent Application No. 10 2016 213 686.0, filed 26 Jul. 2016, the disclosure of which is incorporated herein by reference in its entirety.

SUMMARY

Illustrative embodiments relate to a method for providing an authenticated connection between at least two communication partners and to a communication system.

BRIEF DESCRIPTION OF THE DRAWINGS

The disclosed embodiments are explained below with reference to the associated drawings, in which.

DETAILED DESCRIPTION

Figure 1:
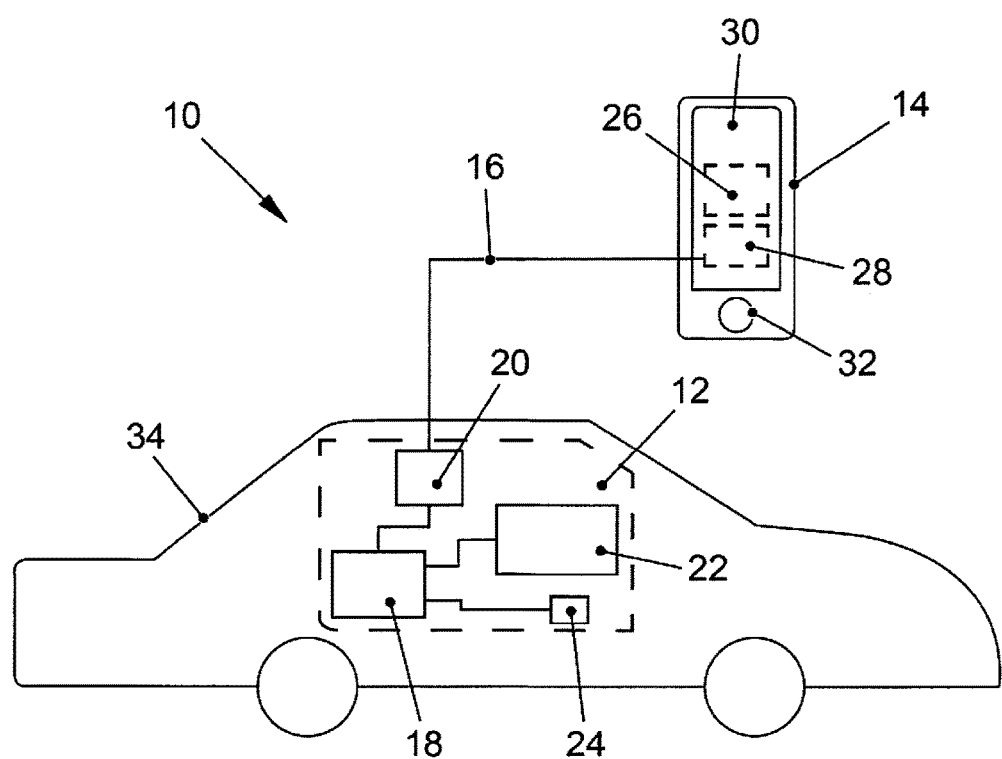
FIG. 1 shows an exemplary embodiment of the communication system in a schematic illustration.

Modern vehicles have infotainment systems which can be coupled to smartphones. By virtue of the coupling, an infotainment system can access media contents, for example, which are stored on the coupled smartphone, to reproduce them in the vehicle.

Moreover, a signal-conducting connection between the vehicle-internal infotainment system and the smartphone can be used to carry out a user identification or to provide application-related user data for the infotainment system.

Since personal data and application-related access data are usually also communicated between the infotainment system and the smartphone, the signal-conducting connection should be equipped with suitable protection.

For this purpose, the document DE 10 2005 028 663 A1 proposes a method in which data packets are exchanged between a transmitting/receiving device of the vehicle and an external transmitting/receiving station, wherein the trustworthiness of the external communication partner can be determined thus to define a security level. In this case, the trustworthiness of the communication partner is determined for example, by an exchange of certificates.

The document DE 10 2012 211 682 A1 discloses a vehicle-based data processing apparatus that is designed to communicate wirelessly with a wireless device situated in the vehicle. For connection set-up, a connection request is sent from the wireless device to the vehicle-based data processing apparatus, which includes the name of an application which would like to use the communication connection. The applications can be signed with a specific certificate, as a result of which they can interact only with specific vehicles.

Furthermore, the document DE 10 2013 225 742 A1 proposes a system comprising a wireless communication device, a vehicle and a server providing a key. The server providing the key is communicatively coupled to the wireless communication device and the vehicle. The wireless communication device communicates a request notification to request temporary security information, such as a public key and/or a digital certificate. The server providing the key, as a response to the request notification, can then supply the wireless communication device and/or the vehicle with the temporary security information. The temporary security information can then be used to encrypt communications between the wireless communication device and the vehicle.

In the known solutions, the authentication of the connection is carried out exclusively by means of certificates. Such authentication requires neither the interaction of the user nor the demonstration of specific knowledge, and so the user has no possibility of influencing the authentication of the connection.

Disclosed embodiments provide a possibility which increases the security of a certificate-based authentication of a communication connection between at least two communication partners.

In the disclosed method for providing an authenticated connection between at least two communication partners, an anonymous signal-conducting connection between the at least two communication partners is set up and the authenticity of a signed certificate used by a first communication partner of the at least two communication partners is checked by a second communication partner of the at least two communication partners. In addition, an authentication code is reproduced by the second communication partner after the check of the authenticity of the signed certificate used by the first communication partner has been carried out. After the authentication code has been reproduced, a user can confirm the authentication code reproduced by the second communication partner by means of the first communication partner.

In the disclosed embodiments, besides a digital signature serving as a trust anchor, a user action is necessary for authenticating the connection between the at least two communication partners. By virtue of the necessity that the user must confirm the reproduced authentication code, the authentication is likewise based on the demonstration of specific knowledge, namely knowledge of the authentication code. The security of a certificate-based authentication of a communication connection between at least two communication partners is thus increased.

In the method, the first communication partner can be embodied as a vehicle-internal device. The vehicle-internal device is embodied as an infotainment system of the vehicle. The first communication partner of the at least two communication partners may act as a server. Alternatively or additionally, in the method, the second communication partner can be embodied as a mobile terminal. The mobile terminal is embodied as a smartphone. The second communication partner of the at least two communication partners may act as a client.

The anonymous signal-conducting connection between the at least two communication partners can be based on a transport layer security protocol. The hybrid encryption of the transport layer security protocol increases security further, without the need for a preceding key exchange. The transport layer security protocol makes it possible to implement higher protocols on the basis of the transport layer security protocol protocol. The transport layer security protocol is thus independent of applications and of the system used.

The signed certificate used by the first communication partner can be signed with a signature certificate and the signature certificate can be available to the second communication partner. By virtue of the fact that the signature certificate is available to the second communication partner, the latter can check the authenticity of the signature certificate by a certificate matching. This type of authenticity check offers a high degree of security.

Checking the authenticity of the signed certificate used by the first communication partner by the second communication partner can comprise checking, by the second communication partner, the signed certificate used by the first communication partner with the signature certificate available to the second communication partner. Checking, by the second communication partner, the signed certificate used by the first communication partner with the signature certificate available to the second communication partner can lead to a positive checking result, for example, by establishing the correctness of the signature of the signed certificate used by the first communication partner with the signature certificate available to the second communication partner. Checking, by the second communication partner, the signed certificate used by the first communication partner with the signature certificate available to the second communication partner can also lead to a negative checking result, for example, by establishing the lack of correctness of the signature of the signed certificate used by the first communication partner with the signature certificate available to the second communication partner. In this case, the authentication of the connection between the at least two communication partners has failed.

The signature certificate can be a certificate which has been issued by a certification body. The certification body is the manufacturer of the vehicle in which the first communication partner is integrated. Alternatively, the certification body can also be a certification body which creates and issues digital certificates for the automotive sector and, if appropriate, other sectors.

The authentication code can be optically reproduced for the user by a display device of the second communication partner. The display device can comprise, for example, a display or a touchscreen. Alternatively or additionally, the authentication code can also be reproduced acoustically for the user by means of a sound reproduction device.

The authentication code can be a vehicle-related code. The authentication code can be embodied as a sequence of letters and/or numbers. The authentication code may be the vehicle identification number of the vehicle in which the first communication partner is installed. Either the vehicle identification number is known to the user or it can be found out without great effort. Since the vehicle identification number is linked to a vehicle, the authentication code is always unambiguous and unique. Moreover, the loss of the vehicle identification number is extremely unlikely since the latter is recorded in all official vehicle documents. The vehicle identification number is thus especially suitable as an authentication code.

Alternatively, the authentication code can be a non-vehicle-related code. By way of example, the authentication code is a freely selected sequence of letters and/or numbers which, for instance, has been generated by the vehicle manufacturer or defined by the user upon purchase of the vehicle. In this way, it is possible to generate an easily remembered authentication code that renders superfluous a process of laboriously looking up the authentication code.

The method can comprise reproducing the authentication code by the first communication partner, wherein the authentication code may be reproduced optically for the user by a display device of the first communication partner. Reproducing the authentication code by the first communication partner leads to a further assistance of the user. If the authentication code is the vehicle identification number of the vehicle, such assistance of the user is expedient since, although the user knows the vehicle identification number, the user cannot readily retrieve it from his/her memory.

The disclosed communication system comprises at least two communication partners wherein the at least two communication partners are configured to set up an anonymous signal-conducting connection to one another. A second communication partner of the at least two communication partners is additionally configured to check the authenticity of a signed certificate used by a first communication partner of the at least two communication partners and to reproduce an authentication code after the check of the authenticity of the signed certificate used by the first communication partner has been carried out. The first communication partner is configured to the effect that a user can confirm the authentication code reproduced by the second communication partner by means of the first communication partner.

The first communication partner can be embodied as a vehicle-internal device. The vehicle-internal device is embodied as an infotainment system of the vehicle. The first communication partner of the at least two communication partners may act as a server. Alternatively or additionally, the second communication partner can be embodied as a mobile terminal. The mobile terminal is embodied as a smartphone. The second communication partner of the at least two communication partners may act as a client.

In the communication system, the anonymous signal-conducting connection between the at least two communication partners can be based on a transport layer security protocol. As a result of the hybrid encryption of the transport layer security protocol, security is increased further without the necessity of a preceding key exchange. The transport layer security protocol makes it possible to implement higher protocols on the basis of the transport layer security protocol protocol. The transport layer security protocol is thus independent of applications and of the system used.

The signed certificate used by the first communication partner of the communication system can be signed with a signature certificate and the signature certificate can be available to the second communication partner of the communication system, wherein the signature certificate may be a certificate which has been issued by a certification body. By virtue of the fact that the signature certificate is available to the second communication partner, the latter can check the authenticity of the signature certificate by a certificate matching. This type of authentication check offers a high degree of security.

The first communication partner and/or the second communication partner of the communication system can have in each case a display device configured to optically reproduce the authentication code for the user. The display device can comprise, for example, a display or a touchscreen. Alternatively or additionally, the authentication code can also be reproduced acoustically for the user by means of a sound reproduction device.

The communication system can additionally be configured to perform the method for providing an authenticated connection between at least two communication partners according to at least one of the embodiments described above. The same benefits and modifications as described above are applicable.

The various embodiments mentioned in this application, unless explained otherwise in an individual case, can be combined with one another.

FIG. 1a shows a communication system 10 comprising two communication partners 12, 14. The first communication partner 12 is embodied as a vehicle-internal device of the vehicle 34, wherein the vehicle-internal device is an infotainment system. The second communication partner 14 is embodied as a mobile terminal, wherein the mobile terminal is embodied as a smartphone.

The first communication partner 12 comprises a computing unit 18, a communication module 20, a display device 22 and an actuation device 24. The communication module 20, the display device 22 and the actuation device 24 are connected to the computing unit 18 in a signal-conducting manner. The communication module 20 is configured to communicate with other communication partners wirelessly, for example, by BLUETOOTH®. The display device 22 is embodied as a display and integrated into the dashboard of the vehicle 34. The actuation device 24 comprises a plurality of pressure-sensitive input elements and is integrated into the center console of the vehicle 34.

The second communication partner 14 likewise comprises a computing unit 26, a communication module 28, a display device 30 and an actuation device 32. The communication module 28, the display device 30 and the actuation device 24 are connected to the computing unit 26 in a signal-conducting manner. The communication module 28 is configured to communicate with other communication partners wirelessly, for example, by BLUETOOTH®. The display device 30 is embodied as a touchscreen. The actuation device 32 is embodied as a pushbutton.

The two communication partners 12, 14 are configured to set up an anonymous signal-conducting connection 16 to one another. The anonymous signal-conducting connection 16 between the two communication partners 12, 14 is based on a transport layer security protocol.

The second communication partner 14 is configured to check the authenticity of a signed certificate used by the first communication partner 12 and to reproduce an authentication code after the check of the authenticity of the signed certificate used by the first communication partner 12 has been carried out. The reproduction of the authentication code is carried out optically by the display device 22 of the first communication partner. The authentication code comprises a plurality of letters and numbers and corresponds to the vehicle identification number of the vehicle 34.

The signed certificate used by the first communication partner 12 is signed with a signature certificate and the signature certificate is available to the second communication partner 14. The signature certificate is a certificate which has been issued by a certification body, namely a vehicle manufacturer.

The first communication partner 12 enables a user to confirm the authentication code reproduced by the second communication partner 14. Confirming the reproduced authentication code is carried out by an actuation of the actuation device 24 of the first communication partner 12. So that the user does not have to look up the vehicle identification number of the vehicle 34 in the official vehicle documents before a confirmation of the reproduced authentication code can be carried out, the vehicle identification number of the vehicle 34 is additionally reproduced optically for the user via the display device 22 of the first communication partner.

The communication system 10 illustrated is additionally configured to perform the method for providing an authenticated connection 16 between at least two communication partners 12, 14.

Figure 2:
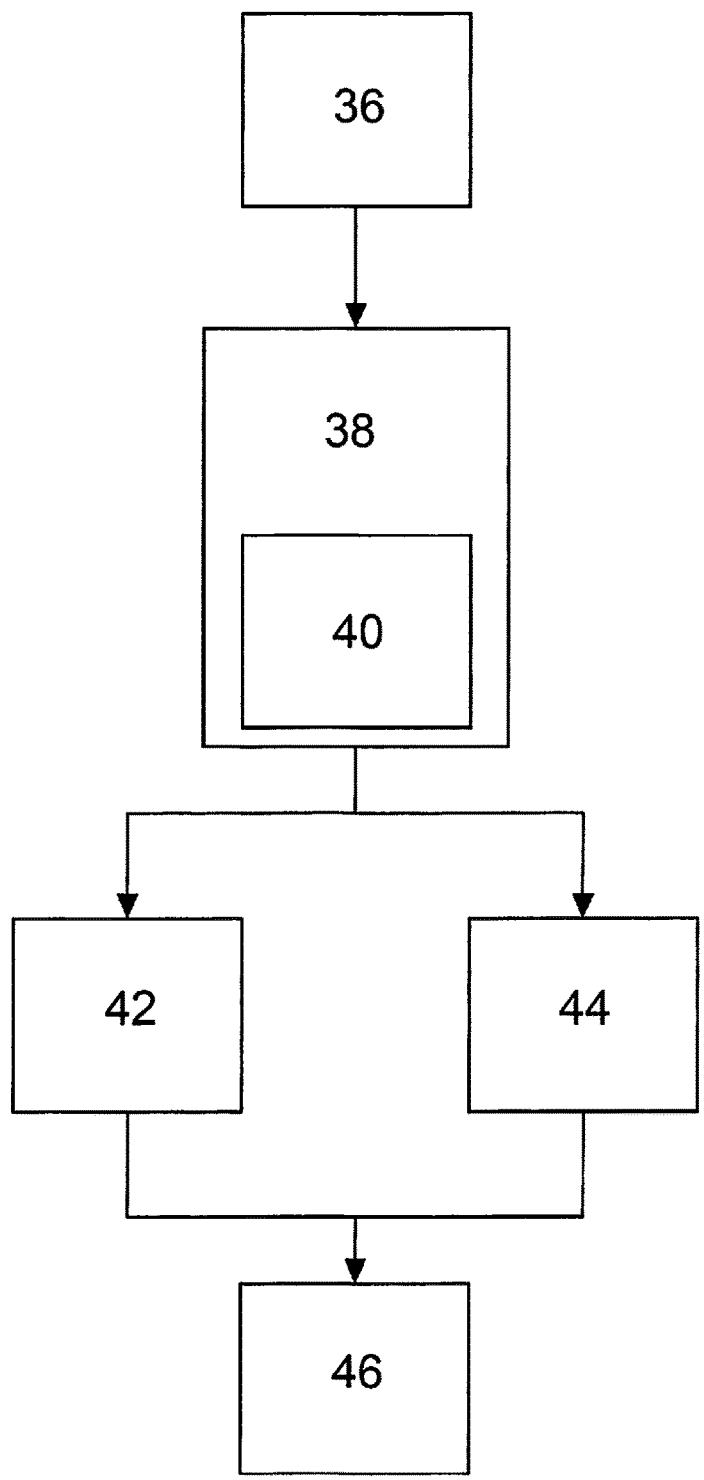
FIG. 2 shows an exemplary embodiment of the method in a schematic flow diagram.

FIG. 2 shows a method for providing an authenticated connection 16 between two communication partners 12, 14, which method begins with the following operation:

36) setting up an anonymous signal-conducting connection 16 between the two communication partners 12, 14.

The first communication partner 12 is embodied as a vehicle-internal device, namely as an infotainment system of a vehicle 34. The second communication partner 14 is embodied as a mobile terminal, namely as a smartphone. The anonymous signal-conducting connection 16 between the two communication partners 12, 14 is based on a transport layer security protocol. After the anonymous signal-conducting connection between the two communication partners 12, 14 has been set up, the following operation is performed:

38) checking the authenticity of a signed certificate used by the first communication partner 12 by the second communication partner.

The signed certificate used by the first communication partner 12 is signed with a signature certificate and the signature certificate is available to the second communication partner 14. The signature certificate is a certificate which has been issued by a certification body, namely a vehicle manufacturer.

Checking the authenticity of the signed certificate used by the first communication partner 12 by the second communication partner 14 comprises the following operation:

40) checking, by the second communication partner 14, the signed certificate used by the first communication partner 12 with the signature certificate available to the second communication partner 14.

After the check of the authenticity of the signed certificate used by the first communication partner 12 has been carried out, the following operations are performed:

42) reproducing the vehicle identification number of the vehicle 34 by the first communication partner 12; and 44) reproducing the authentication code by the second communication partner 14.

The authentication code and the vehicle identification number are reproduced optically for the user by display devices 22, 30 of the first communication partner 12 and of the second communication partner 14. The authentication code is a vehicle-related code, namely the vehicle identification number of the vehicle 34. If the authentication code reproduced by the second communication partner 12 is correct, that is to say if it corresponds to the vehicle identification number and thus also to the value displayed by the first communication partner 12, the authentication of the connection 16 can be concluded by the following operation:

46) confirming the authentication code reproduced by the second communication partner 14 by a user by means of the first communication partner 12.

The confirmation of the authentication code reproduced by the second communication partner 14 is carried out by the actuation of an actuation device 24 of the first communication partner 12.

The disclosed embodiments, through the combination of a certificate-based authentication with a knowledge-based authentication, makes it possible to increase the authentication security and thus leads to a more secure communication between two or more communication partners.

LIST OF REFERENCE SIGNS

10 Communication system
12 First communication partner
14 Second communication partner
16 Connection
18 Computing unit 20 Communication module
22 Display device
24 Actuation device
26 Computing unit
28 Communication module
30 Display device
32 Actuation device
34 Vehicle
36-46 Method operations

The invention claimed is:

1. A method for providing an authenticated connection between at least two communication partners, the method comprising:

setting up an anonymous signal-conducting connection between the at least two communication partners;

checking an authenticity of a signed certificate used by a first communication partner of the at least two communication partners by a second communication partner of the at least two communication partners;

displaying a first authentication code by the second communication partner after the check of the authenticity of the signed certificate used by the first communication partner has been carried out;

displaying a second authentication code by the first communication partner on a display device of the first communication partner;

comparing the first and second authentication codes displayed by the first and second communication partners; and confirming the first and second authentication codes displayed by the first and second communication partners match by a user, wherein the first communication partner is a vehicle-internal device, and the second authentication code displayed by the first communication partner is a vehicle-related code, wherein the signed certificate used by the first communication partner is signed with a signature certificate and the signature certificate is available to the second communication partner, and wherein checking the authenticity of the signed certificate used by the first communication partner by the second communication partner comprises checking, by the second communication partner, the signed certificate used by the first communication partner with the signature certificate available to the second communication partner.

2. The method of claim 1, wherein the second communication partner is a mobile terminal.

3. The method of claim 1, wherein the anonymous signal-conducting connection between the at least two communication partners is based on a transport layer security protocol.

4. The method of claim 1, wherein the signature certificate is a certificate which has been issued by a certification body.

5. The method of claim 1, wherein the first authentication code displayed by the second communication partner is displayed for the user by a display device of the second communication partner.

6. The method of claim 1, wherein the second authentication code displayed by the first communication partner is a vehicle identification number unique to a vehicle associated with the first communication partner.

7. A communication system, comprising:
at least two communication partners, wherein the at least two communication partners are configured to set up an anonymous signal-conducting connection to one another, wherein a second communication partner of the at least two communication partners is configured to check an authenticity of a signed certificate used by a first communication partner of the at least two communication partners and to display a first authentication code after the check of the authenticity of the signed certificate used by the first communication partner has been carried out, and wherein the first communication partner is configured to display a second authentication code on a display device of the first communication partner to allow a user to confirm a match of the first and second authentication codes displayed by the first and second communication partners by the first communication partner, wherein the first communication partner is a vehicle-internal device, and the second authentication code displayed by the first communication partner is a vehicle-related code, wherein the signed certificate used by the first communication partner is signed with a signature certificate and the signature certificate is available to the second communication partner, and wherein checking the authenticity of the signed certificate used by the first communication partner by the second communication partner comprises checking, by the second communication partner, the signed certificate used by the first communication partner with the signature certificate available to the second communication partner.

8. The communication system of claim 7, wherein the second communication partner is a mobile terminal.

9. The communication system of claim 7, wherein the anonymous signal-conducting connection between the at least two communication partners is based on a transport layer security protocol.

10. The communication system of claim 7, wherein the signed certificate used by the first communication partner is signed with a signature certificate and the signature certificate is available to the second communication partner, wherein the signature certificate is a certificate which has been issued by a certification body.

11. The communication system of claim 7, wherein the first authentication code displayed by the second communication partner for the user is displayed on a display device of the second communication partner.

12. The communication system of claim 7, wherein the second authentication code displayed by the first communication partner is a vehicle identification number unique to a vehicle associated with the first communication partner.

13. A non-transitory computer readable medium comprising: a program including program code for carrying out a method for providing an authenticated connection between at least two communication partners when the program code is executed on a computer, on a processor, on a control module or on a programmable hardware component, the method comprising:

setting up an anonymous signal-conducting connection between the at least two communication partners;

checking an authenticity of a signed certificate used by a first communication partner of the at least two communication partners by a second communication partner of the at least two communication partners;

displaying a first authentication code by the second communication partner after the check of the authenticity of the signed certificate used by the first communication partner has been carried out;

displaying a second authentication code by the first communication partner by a display device of the first communication partner;

comparing the first and second authentication codes displayed by the first and second communication partners; and confirming the first and second authentication codes displayed by the first and second communication partners match by a user, wherein the first communication partner is a vehicle-internal device, and the second authentication code displayed by the first communication partner is a vehicle identification number unique to a vehicle associated with the first communication partner, wherein the signed certificate used by the first communication partner is signed with a signature certificate and the signature certificate is available to the second communication partner, and wherein checking the authenticity of the signed certificate used by the first communication partner by the second communication partner comprises checking, by the second communication partner, the signed certificate used by the first communication partner with the signature certificate available to the second communication partner.

14. The communication system of claim 13, wherein the first communication partner is a vehicle-internal device and/or the second communication partner is a mobile terminal.

15. The communication system of claim 13, wherein the anonymous signal-conducting connection between the at least two communication partners is based on a transport layer security protocol.

16. The communication system of claim 13, wherein the signature certificate is a certificate which has been issued by a certification body.

17. The communication system of claim 13, wherein the first authentication code displayed by the second communication partner is displayed for the user by a display device of the second communication partner.

18. The communication system of claim 13, wherein the second authentication code displayed by the first communication partner is a vehicle identification number unique to a vehicle associated with the first communication partner.

* * * * *